United States Patent [19]

Ogawa

[11] Patent Number: 5,018,840
[45] Date of Patent: May 28, 1991

[54] IMAGE DISPLAY DEVICE HAVING A PHOTOSETTING BINDER

[75] Inventor: Kazufumi Ogawa, Hirakata, Japan

[73] Assignee: Matsushita Electric Industrial Co., Ltd., Osaka, Japan

[21] Appl. No.: 445,097

[22] Filed: Dec. 6, 1989

Related U.S. Application Data

[60] Continuation of Ser. No. 281,890, Dec. 8, 1988, abandoned, which is a continuation of Ser. No. 83,827, Aug. 11, 1987, abandoned, which is a division of Ser. No. 890,654, Jul. 30, 1986, abandoned.

[30] Foreign Application Priority Data

Jul. 31, 1985 [JP] Japan .................. 60-169056
Jul. 31, 1985 [JP] Japan .................. 60-169057

[51] Int. Cl.$^5$ .................................. G02F 1/13
[52] U.S. Cl. ....................... 350/349; 350/351; 350/352; 350/339 F
[58] Field of Search ............ 350/352, 351, 331 R, 350/339 F, 349

[56] References Cited

U.S. PATENT DOCUMENTS

| 3,578,844 | 3/1971 | Churchill et al. | 350/351 |
| 3,585,381 | 6/1971 | Hodson et al. | 350/351 |
| 3,600,060 | 8/1971 | Churchill et al. | 350/331 R |
| 3,697,297 | 10/1972 | Churchill et al. | 264/4.3 |
| 3,732,119 | 5/1973 | Churchill et al. | 117/1.7 |
| 3,872,050 | 3/1975 | Benton et al. | 350/351 |
| 3,919,110 | 11/1975 | Vassiliades et al. | 252/316 |
| 4,175,543 | 11/1979 | Suzuki et al. | 128/736 |
| 4,556,289 | 12/1985 | Fergason | 350/349 |
| 4,579,423 | 4/1986 | Fergason | 350/354 |
| 4,601,967 | 7/1986 | Suzuki et al. | 430/138 |
| 4,610,945 | 9/1986 | Matsuoka et al. | 430/138 |
| 4,688,900 | 8/1987 | Doane et al. | 350/351 |

FOREIGN PATENT DOCUMENTS

| 0143093 | 11/1979 | Japan | 350/349 |
| 0089720 | 7/1981 | Japan | 350/349 |
| 0214016 | 12/1984 | Japan | 350/349 |

OTHER PUBLICATIONS

Clecak et al, "Display Using Liquid Crystal Dyes", IBM Technical Bulletin, vol. 22, No. 6, Nov. 1979.
Berman et al, "A Method for Constructing Very Large Light-Field Pleochroic Liquid Crystal Displays", Preceeding of SID, vol. 21, No. 2, Apr. 1980.

Primary Examiner—Stanley D. Miller
Assistant Examiner—Huy K. Mai
Attorney, Agent, or Firm—Wenderoth, Lind & Ponack

[57] ABSTRACT

Disclosed is a liquid crystal composition which may be used for an image display device. The liquid crystal composition includes a plurality of microcapsules in which liquid crystal is enclosed. The microcapsules are colored in red, green, blue and dispersed in binder. When the liquid crystal composition is used for a liquid crystal display device for image display, it becomes very easy to fabricate the display device since liquid crystal, which is rather difficult to be handled, is enclosed in microcapsules.

2 Claims, 2 Drawing Sheets

IMAGE DISPLAY DEVICE HAVING A PHOTOSETTING BINDER

This application is a continuation of now abandoned application Ser. No. 281,890, filed Dec. 8, 1988, which application is a continuation of now abandoned application Ser. No. 083,827, filed Aug. 11, 1987, which application is, in turn, a division of now abandoned application Ser. No. 890,654, filed July 30, 1986.

BACKGROUND OF THE INVENTION

This invention relates to an electric-field responsive liquid crystal composition and an electric-field responsive image display device using the same, and more particularly to a flat display panel using liquid crystal for color display of TV picture, computer image or the like.

The conventional color liquid crystal panel was generally an overlaid combination of liquid crystal which is injected among confronting electrodes arranged in a matrix, and color filters. For example, a TFT (thin film transistor) array having picture element electrodes on a glass substrate, and a composition of common transparent electrodes placed on a plurality of red, blue and green color filters formed on a transparent substrate are preliminarily assembled together by means of spacers, and TN (twist nematic) liquid crystal is injected to compose a panel structure, and by installing polarizing plates at the front and back of this panel, and TFT is operated while irradiating with back light, thereby displaying a color image.

Therefore, the liquid crystal is used as a mere shutter of the light passing through the filter which is an individual color element, and the reliability is sufficient, but the conventional constitution and fabrication method involve the following demerits.

That is, since injection of liquid crystal and fabrication of filter are separate steps, the panel assembling process is very complicated, and the productivity is inferior.

SUMMARY OF THE INVENTION

It is hence a primary object of this invention to eliminate the above-discussed defects of the conventional art, by presenting a liquid crystal composition having a plurality of microcapsules in which liquid crystal is enclosed. The microcapsule is colored and dispersed in a binder, or dispersed in a colored binder.

It is further an object of this invention to enable to integrate the liquid crystal injecting step, color filter fabricating step, and panel assembling step, by using a liquid crystal device which has the above-stated liquid crystal composition structure.

These and other objects of the present invention are accomplished by the invention set forth in the appended claims.

According to the present invention as described herein, the following benefits, among others, are obtained:

(1) Since liquid crystal is injected into microcapsule, handling of liquid crystal is easy.

(2) When this liquid crystal composition is used in an image display device, liquid crystal injection step and filter manufacturing step can be done in one process, so that fabrication may be facilitated.

While the novel features of the invention are set forth with particularity in the appended claims, the invention, both as to organization and content, will be better understood and appreciated, along with other objects and features thereof, from the following detailed description taken in conjunction with the drawings, in which:

DETAILED DESCRIPTION OF THE INVENTION

Figure 1:
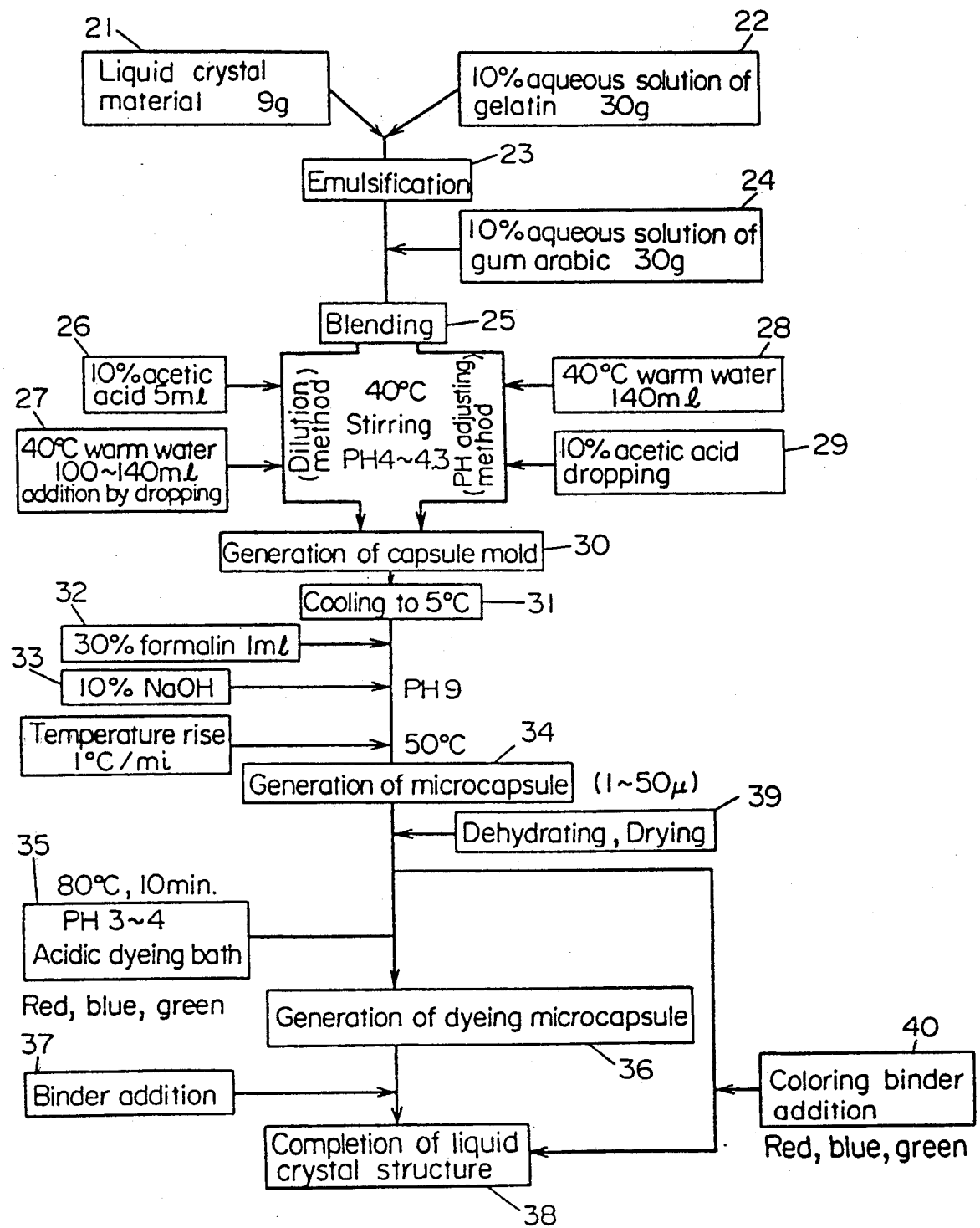
FIG. 1 is a process chart to explain the method of fabricating a liquid crystal composition in one of the embodiments of this invention.
Figure 2:
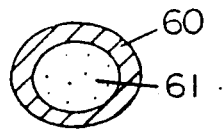
FIG. 2 is an enlarged sectional view showing an example of liquid crystal composition.

A liquid crystal composition in one of the embodiments of this invention and an example of fabricating the same are described while referring to FIGS. 1 and 2.

For example, 9 gram of liquid crystal material (21) of nematic type, twist nematic type, smectric type or ferroinductive type is dropped into 30 gram of 10% aqueous solution of gelatin (22), and is dispersed and emulsified (23) while stirring. Further, 30 gram of 10% aqueous solution of gum arabic (24) is added to be mixed (25). Later, by dropping to add 5 ml of 10% acetic acid (26) and 100 to 140 ml of 40° C. warm water (27), and adding 140 ml of 40° C. water (28) and 10% acetic acid (29), the pH is adjusted to 4 to 4.3 to fabricate a capsule prototype (30). Then cooling to about 5° C. (31), and adding 1 ml of 30% formalin (32) and 10% NaOH water (33), the solution is heated to about 50° C. to harden the capsule (34), thereby microcapsules of 1 to 50 μm are formed, in which capsule a liquid crystal is enclosed.

Next, after dehydrating and drying, the liquid crystal are immersed in red, blue or green dyeing bath (35) to stain the microcapsule surface (36). Further by diffusing into a binder (37) made of photosensitive resin or a heat resistance binder, a liquid crystal composition is prepared (38).

FIG. 2 is an enlarged sectional view showing an example of liquid crystal microcapsule composition, in which numeral 60 denotes a capsule and 61 is liquid crystal which fills up the capsule 60.

Incidentally, the same effect is obtained when dispersing into a precolored binder (40) after dehydrating and drying (3) the microcapsule. As the polymer for preparing microcapsule, it may be also possible to use, aside from gelatin, protein such as casein, vegetable gum, cellulose derivative, condensed polymer, waxy matter, or polysaccharides. As the coloring matter, a pigment may be dispersed in the polymer or binder.

Figure 3:
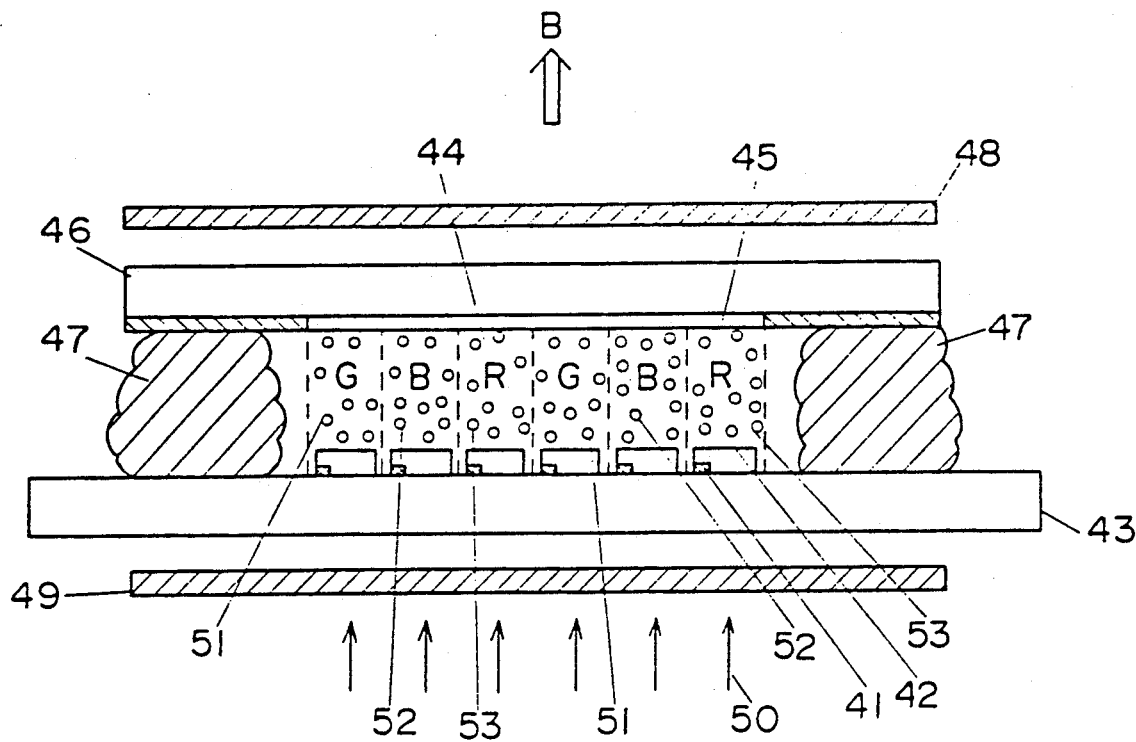
FIGS. 3 and 4 are sectional views of image display device using this liquid crystal composition.

The image display device using the above liquid crystal composition and the method of fabricating the same are explained below. As shown in FIG. 3, the above liquid crystal compositions (colored in red, blue and green) are mounted, in stripe or mosaic form, onto a glass substrate 43 on which TFT (thin film transistor) array 41 and transparent picture element electrode 42 are formed. At this time, if the binder is of photosetting type, the photolithographic technique may be employed, but if not photosensitive, printing or similar method may be employed to mount. Furthermore, in contact with said liquid crystal, a transparent substrate 46 on which a common transparent electrode 45 is formed is mounted by way of an adhesive 47, so that an image display panel may be fabricated.

Figure 4:
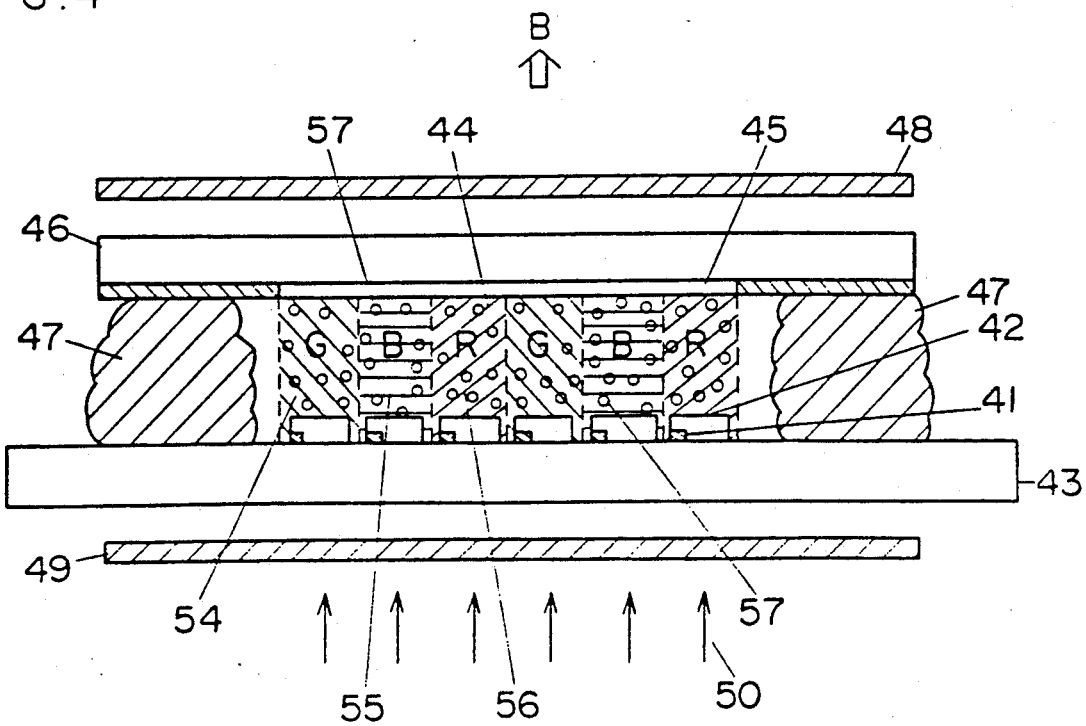

Finally, when the TFT array 41 is driven while irradiating with back light 50 being held by two polarizing plates 48, 49 on both sides, a picture is displayed in the direction of arrow B. In FIG. 3, meanwhile, numeral 51 denotes a green colored microcapsule liquid crystal composition group, 52 is a blue colored one, and 53 is a red colored one. In this case, naturally, the liquid crystal presents orientation and non-orientation within each capsule. By the way, an embodiment of coloring the binder without coloring the capsule is shown in FIG. 4, in which numeral 54 is a green colored binder, 55 is a blue colored one, and 56 is a red colored one, while 57 denotes a liquid crystal composition group of uncolored transparent capsule.

While specific embodiments of the invention have been illustrated and described herein, it is realized that other modifications and changes will occur to those skilled in the art. It is therefore to be understood that the appended claims are intended to cover all modifications and changes as fall within the true spirit and scope of the invention.

What I claim is:

1. An image display device which comprises liquid crystal elements which elements are composed of
   (a) a plurality of microcapsules in which an electric field responsive nematic, twist nematic, smectic or ferro-inductive liquid crystal is enclosed and the outer surface of which is colored said microcapsules being dispersed in a photosetting binder, or p1
   (b) a plurality of microcapsules in which an electric field responsive nematic, twist nematic, smectic or ferro-inductive liquid crystal is enclosed said microcapsules being dispersed in a colored photosetting binder, said liquid crystal elements being held between two confronting electrodes after being photoset in a pattern.

2. An image display device comprising a plurality of colored liquid crystal picture elements disposed in stripe or mosaic form on a single substrate, the said liquid crystal picture elements being composed of:
   (a) a plurality of microcapules in which an electric field responsive nematic, twist nematic, smectic or ferro-inductive liquid crystal is enclosed and the outer surface of which is colored said microcapsules being dispersed in a photosetting binder, or
   (b) a plurality of microcapules in which an electric field responsive nematic, twist nematic, smectic or ferro-inductive liquid crystal is enclosed said microcapsules being dispersed in a colored photosetting binder, said elements being held individually between two confronting electrodes after being photoset in a pattern.

* * * * *